United States Patent
Schneider et al.

(10) Patent No.: US 9,341,297 B2
(45) Date of Patent: May 17, 2016

(54) CLOSURE ELEMENT FOR PIPE ENDS

(75) Inventors: Gerald Schneider, Ratingen (DE); Dieter Beckmann, Mülheim a.d. Ruhr (DE); Volker Ketzer, Essen (DE)

(73) Assignee: Vallourec Deutschland GmbH, Dësseldorf (DE)

( * ) Notice: Subject to any disclaimer, the term of this patent is extended or adjusted under 35 U.S.C. 154(b) by 144 days.

(21) Appl. No.: 14/234,511

(22) PCT Filed: Jul. 20, 2012

(86) PCT No.: PCT/EP2012/064316
§ 371 (c)(1),
(2), (4) Date: Feb. 26, 2014

(87) PCT Pub. No.: WO2013/014089
PCT Pub. Date: Jan. 31, 2013

(65) Prior Publication Data
US 2015/0034197 A1    Feb. 5, 2015

(30) Foreign Application Priority Data

Jul. 28, 2011  (DE) .......................... 10 2011 052 227

(51) Int. Cl.
*F16L 55/10* (2006.01)
*F16L 55/11* (2006.01)
*F16L 57/00* (2006.01)

(52) U.S. Cl.
CPC ........... *F16L 55/1141* (2013.01); *F16L 57/005* (2013.01)

(58) Field of Classification Search
USPC ....................................... 138/89, 96 R, 96 T
See application file for complete search history.

(56) References Cited

U.S. PATENT DOCUMENTS

| 1,749,162 | A |   | 3/1930 | Scott |   |
|---|---|---|---|---|---|
| 2,092,535 | A | * | 9/1937 | Schnorr | B65D 59/02 138/96 T |
| 2,226,233 | A | * | 12/1940 | Shapiro | E03C 1/22 138/89 |
| 2,444,149 | A | * | 6/1948 | Aldridge | F02P 5/103 138/89 |
| 2,708,453 | A | * | 5/1955 | Das | B65D 59/00 138/96 R |

(Continued)

FOREIGN PATENT DOCUMENTS

| DE | 8414522 U1 | 7/1985 |
|---|---|---|
| DE | 102006045592 A1 | 4/2008 |

(Continued)

OTHER PUBLICATIONS

International Search Report completed Oct. 5, 2012, from corresponding International Application No. PCT/EP2012/064316.

(Continued)

*Primary Examiner* — James Hook
(74) *Attorney, Agent, or Firm* — Gardner, Linn, Burkhart & Flory, LLP

(57) ABSTRACT

A closure element for closing the ends of pipes, in particular steel pipes, having a circular base cover whose outer diameter corresponds at most to the outer diameter of the pipe, having a side which faces towards the pipe interior and comprises at least two elastic clamping elements which in the assembled condition are supported on the inner surface of the pipe and clamp the base cover therewith. In order to permit universal usage, the closure element comprises means for selectively adjusting/changing the radial position of the clamping elements on the base cover.

11 Claims, 4 Drawing Sheets

(56) References Cited

U.S. PATENT DOCUMENTS

| | | | | |
|---|---|---|---|---|
| 2,896,223 | A * | 7/1959 | Treslo | A47K 1/14 138/89 |
| 3,087,512 | A * | 4/1963 | Hickman | B65D 59/06 137/377 |
| 3,508,586 | A * | 4/1970 | Gimler | F16L 55/10 138/109 |
| 3,820,682 | A * | 6/1974 | Davella | G02B 23/16 138/89 |
| 3,998,245 | A * | 12/1976 | Martin | E03B 5/06 138/89 |
| 4,100,629 | A * | 7/1978 | Jones | B64D 11/02 138/89 |
| 4,630,646 | A | 12/1986 | Koehle | |
| 4,682,707 | A * | 7/1987 | Wiles | B65D 43/0272 138/89 |
| 6,286,553 | B1 * | 9/2001 | Morgan | F16J 13/08 138/89 |
| 2008/0236691 | A1 | 10/2008 | Roll | |
| 2011/0126935 | A1 | 6/2011 | Zeyfang | |

FOREIGN PATENT DOCUMENTS

| | | |
|---|---|---|
| JP | 1990143596 U | 12/1990 |
| JP | 1995025395 U | 5/1995 |
| JP | 1997210287 A | 8/1997 |
| JP | 2000005043 A | 11/2000 |
| JP | 2001348052 A | 12/2001 |
| JP | 2002106782 A | 10/2002 |
| JP | 2005299740 A | 10/2005 |
| JP | 2007315586 A | 12/2007 |
| WO | 20080044363 A1 | 4/2008 |
| WO | 2011/065978 A1 | 6/2011 |

OTHER PUBLICATIONS

Translation of International Preliminary Report on Patentability for corresponding International Application No. PCT/EP2012/064316 issued Jan. 28, 2014.

* cited by examiner

CLOSURE ELEMENT FOR PIPE ENDS

CROSS REFERENCE TO RELATED APPLICATION

The present application claims the priority benefits of International Patent Application No. PCT/EP2012/064316, filed on Jul. 20, 2012, and also of German Patent Application No. DE 10 2011 052 227.1, filed on Jul. 28, 2011, which are hereby incorporated herein by reference in their entireties.

BACKGROUND OF THE INVENTION

The invention relates to a closure element for closing an end of a pipe, in particular a steel pipe.

Closure elements of this type are used typically to protect pipe ends when pipes are transported and the interior of the pipe is to be protected against the ingress of dirt or moisture. Also, if the pipes are welded or bolted on the building site, the pipe ends must be protected against damage during transportation.

Attachable closure elements have hitherto been established as temporary protection for pipe ends. Closure elements of this type consist of a base cover and of a cylindrical outer casing consisting of an elastic synthetic material and formed as a collar, wherein the collar engages around the outer periphery of the pipe end and becomes more or less fixedly clamped to the pipe in a non-positive manner by means of elastic resilience.

However, these closure elements are faced with the problem that, on account of the collar which lies on the outer surface, the closure elements frequently become detached from the pipe end or become damaged during transportation e.g. as a result of shaking movements or relative movements of the pipes with respect to each other, and therefore the protective function is no longer provided. Moreover, it is necessary to adhere to very narrow tolerances for the inner diameter of the collar, so that on the one hand the collar lies in a non-positive manner against the pipe surface and on the other hand can be attached without excessive application of force.

Documents DE 10 2006 045 592 A1 and DE 84 14 522 disclose closure elements which are not attached to the pipe end in the manner described above but rather become fixedly clamped inside the pipe. For this purpose, the cover of these closure elements has elastic clamping elements which are distributed over the periphery on the side facing towards the interior of the pipe and, when inserted into the pipe, become clamped with the inner surface of the pipe by means of elastic resilience.

In the case of closure elements of this type, the risk of the closure elements becoming detached from the pipe end is less than in the case of the previously described closure elements, as the base cover lies flush against the end surface of the pipe end and does not engage around the pipe end.

However, in the case of these closure elements, gripping lugs for removing the closure element protrude beyond the outer periphery of the pipe, so that in this case contact points are also present which can lead to the closure element becoming inadvertently detached from the pipe.

Moreover, in the case of both solutions it is disadvantageous that e.g. in the case of a constant outer diameter and greatly varying inner diameters, a large number of different closure elements is required, since the elastic clamping elements of these known closure elements can only compensate for small fluctuations in the inner diameter which in the range of rolling tolerances are up to several mm.

In the case of pipes whose wall thicknesses can vary, depending upon the order, by up to 10 cm or more while the outer diameter remains constant at e.g. 600 mm, as is possible e.g. in the case of seamless, hot-rolled pipes produced by means of the pilger method, the known closure elements which are configured for clamping within the framework of rolling tolerances only to a nominal inner diameter can no longer be used.

In such cases, closure elements designed in accordance with the respective wall thicknesses must be used. The provision of the requisite large number of closure element variants is very complicated logistically, is cost-intensive and thus uneconomical.

Moreover, laid-open document US 2008/0236691 A1 already discloses plugs used to close a plurality of bores in a concrete pipe. The total of four bores in the casing surface of the concrete pipe are used for attaching a cable in order to handle the concrete pipe for laying in the ground. If the bores are no longer required they can be closed by the plugs. Each of the plugs consists of a disk, a support part and elastic fins. The planar disk has a diameter which is larger than the diameter of the bores in order to cover them. The underside of the disk facing the bore is adjoined centrally by the cruciform support part which extends away from the underside and thus protrudes into the bore in the assembled condition. The support part has an outer diameter which is somewhat smaller than the inner diameter of the bore. In order to be able to attach the plug in the bore, the four ends of the cruciform support part are externally adjoined in each case by elastic fins whose outer ends have a diameter which is larger than the inner diameter of the bore. Upon insertion of the support part with the fins into the bore, the fins yield in an elastic manner and lie with their outer ends internally against the inner wall of the bore. The elastic resilience of the fins serves to hold the plug in the bore. The plug with the disk, the support part and the fins is produced as a one-piece synthetic material injection-moulded part.

SUMMARY OF THE INVENTION

It is the object of the invention to provide a closure element of the aforementioned type which can be inserted into an end of a pipe and which on the one hand ensures secure purchase against the inner surface of the pipe even during transportation and on the other hand, with a constant nominal outer diameter, can also be adapted simply and flexibly to significant differences in wall thickness, i.e., changes in the nominal inner diameter.

This object is achieved by a closure element in accordance with the present invention.

In accordance with an embodiment of the present invention, this object is achieved by a closure element having a circular base cover, by means of which in an assembled condition it is possible to close the end of the pipe, on which on a side facing towards the pipe at least two clamping elements are disposed which in the assembled condition are supported on an inner surface of the pipe and hold the base cover for closing the end of the pipe, wherein the clamping elements are releasably attached to the base cover and can be attached in various positions to the base cover for selectively adjusting the radial position of the clamping elements on the base cover, so that with the outer diameter being constant, it is possible to adapt flexibly to different nominal wall thicknesses by changing the radial position of the clamping elements on the base cover.

In the assembled condition, the base cover lies flush against the end surface of the pipe and closes the end of the pipe. The clamping elements are provided with elastically deformable clamping lips which, upon insertion into the pipe end, are supported against the inner wall of the pipe and thus become clamped therewith in a non-positive manner by means of elastic resilience.

Therefore, in accordance with an embodiment of the invention a closure element is provided, in which on the inner side of the base cover radially adjustable clamping elements are attached whose radial position on the base cover can be adapted or adjusted in accordance with the currently provided wall thickness when the outer diameter of the pipes is constant.

Smaller changes in wall thickness which are within the tolerance range of the pipe are advantageously compensated for by means of the elastically deformable clamping lips of the clamping elements themselves without any radial adjustment as known from the Prior Art. In this way, fluctuations in the inner diameter up to about 10 mm can be compensated for.

Changes in wall thickness e.g. in the range of up to 10 cm or more are compensated for by radial offsetting of the clamping elements on the base cover.

The base cover itself has a diameter which is not greater than the respective outer diameter of the pipe, in order in each case to prevent protrusion of the cover beyond the pipe periphery and thus a contact surface for inadvertent detachment of the closure element from the pipe during transportation.

The number of clamping elements disposed on the base cover in the peripheral direction is advantageously governed by the inner diameter of the pipes. Whereas for pipes with a smaller inner diameter of e.g. 100 mm two clamping elements are generally sufficient, for larger pipes with inner diameters of e.g. 400 mm or greater five or more clamping elements are required, in order to be able to insert the closure element into the end of the pipe in the most effectively centred manner possible.

The base cover and clamping elements are produced advantageously as injection-moulded parts from thermoplastic synthetic material. Since these parts fulfil different functions, in one advantageous embodiment of the invention they are produced from different materials.

Since the base cover is intended to withstand rough transport conditions without getting damaged, it is to be designed in the most rigid and impact-resistant manner possible. Engineering synthetic material, such as for example polyamide with a density of more than 1 $g/cm^3$, has proven to be an advantageous material for this purpose, wherein in the case of large pipe diameters the base cover can be additionally provided with stiffening beads.

The elastically deformable clamping lips of the clamping elements must become clamped with the inner surface of the pipe by means of elastic resilience as the closure element is being inserted, in order to ensure a secure holding arrangement. Polyethylene has proven to be advantageous as a material for the elastic clamping elements.

The closure element can then be removed from the end of the pipe for example by means of a material weakness or opening which is incorporated into the base cover for injection-moulding purposes and through which e.g. a hook-shaped tool can be introduced and the cover can thus be pulled out of the pipe. However, the material weakness or opening should not be too large so as not to impair the protective function of the cap. Opening diameters of less than 20 mm have proven to be favourable.

If an opening in the base cover is not desired, the closure element can also be levered off the end of the pipe. For this purpose, a lever tool is attached between the end surface of the pipe and the base cover and the closure element is levered off. This can be performed for example with a putty knife, a screwdriver or similar tools.

By virtue of the fact that the clamping elements can be adjusted radially on the base cover, a wide variety of variants can be covered for different inner pipe diameters with a constant outer diameter, without having to provision differently prefabricated, correspondingly adapted closure elements. As a consequence, the costs for acquisition and logistics are significantly reduced. Moreover, since, in contrast to the Prior Art, only separately manufactured base covers and clamping elements have to be transported and stored, considerably less transport and storage capacity is required for the individual parts.

In order to assemble the closure elements in accordance with the outer diameters of the pipes, standard base covers and the corresponding clamping elements are provisioned in practice. The clamping elements themselves are dimensioned as standard elements independently of the pipe diameter and the wall thickness, so that only different base covers corresponding to the produced outer pipe diameters are required.

In an advantageous embodiment of the invention, it is provided that the clamping elements are configured to permit a continuous or raster-like adjustment of the radial position of the clamping elements according to the currently provided wall thickness of the pipes.

Continuous adjustability can be accomplished e.g. by means of displacement-clamping in accordance with the tongue and groove principle.

The attachment of the clamping elements with a raster-like plug-in connection on the base cover is to be particularly recommended, since the base cover and the clamping elements are to be connected in a convenient manner by means of a plug-in connection. The raster dimension is advantageously configured to cover the standard wall thicknesses of the pipes.

In order to establish the plug-in connection, in one advantageous embodiment the base cover is provided with protruding, bolt-like elements which in a fixed raster are disposed in a radial manner, optionally on a plug-in strip, and to which the clamping elements can be attached.

For this purpose, the clamping elements are provided with a bearing plate which can be connected to the base cover and which, in order to receive the bolt-like elements during attachment of the clamping elements, is provided with bores, which are adapted so as to correspond to the bolt diameter, in the corresponding raster dimension.

In order to assemble the closure element, the bearing plates of the individual clamping elements are attached in the respective radial position to the corresponding bolts of the base cover in accordance with the wall thickness of the pipe which is to be closed and comprises the bores, such that the bolts are urged through the bores and become clamped therein.

In order to prevent the clamping elements from becoming inadvertently detached from the base cover, the diameters of the bolts and bores are tailored to each other such that during attachment a clamping effect occurs which ensures that the clamping elements are held securely on the base cover.

In this case, the number of bolts which become clamped with the bearing plate is configured such that the bearing plate cannot become detached from the base cover under normal transport conditions. However, it should be possible for the bearing plate and the base cover to be connected to each other at least at two locations and preferably at four or six locations.

However, in a further embodiment the base cover can be provided with bores and the bearing plates of the clamping elements can be provided with corresponding bolts, should this be more advantageous from a manufacturing point of view.

The invention permits numerous embodiments. In order to further illustrate the basic principle of the invention, one of these embodiments is described hereinafter and is illustrated in the accompanying drawings.

DETAILED DESCRIPTION

Figure 1A:
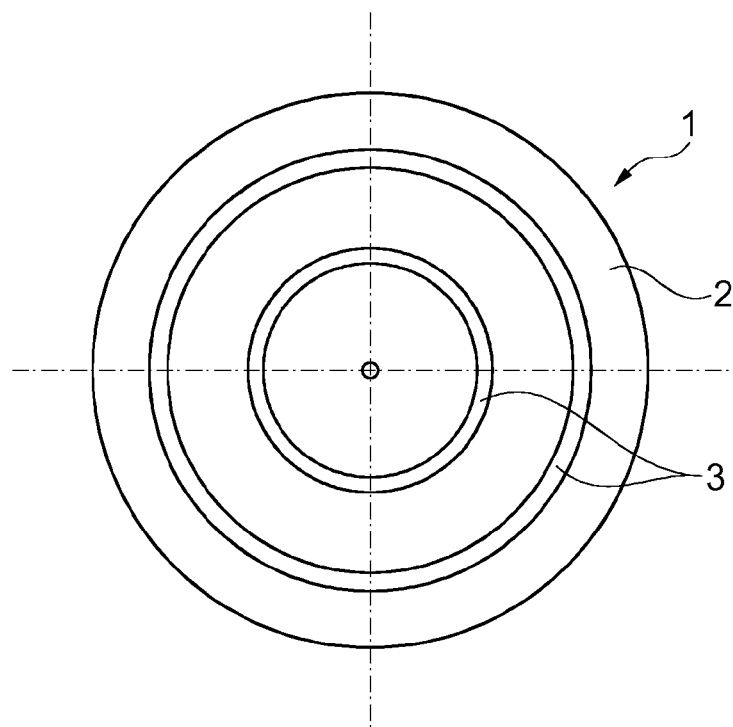
FIG. 1a shows a schematic illustration of the front side of the closure element.
Figure 1B:
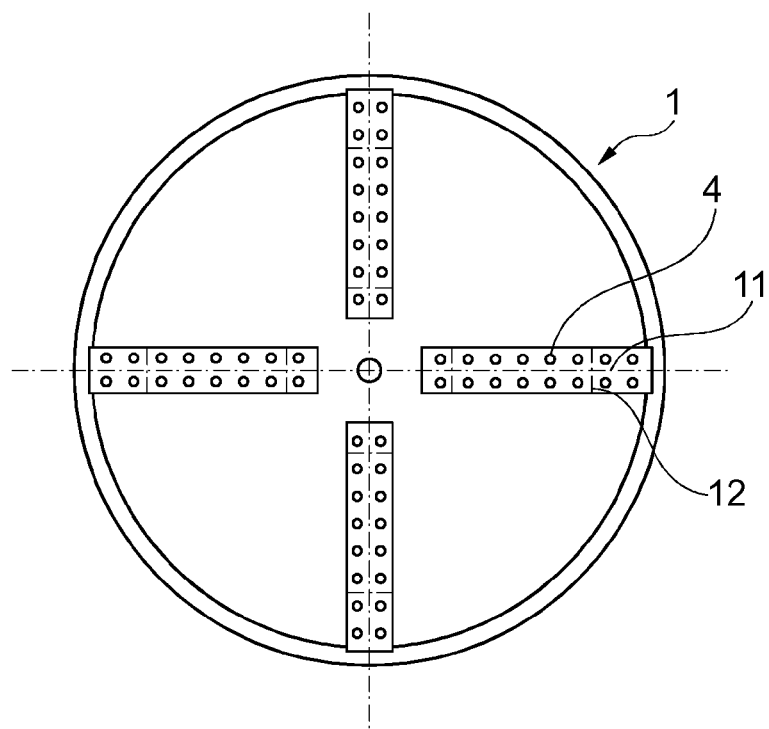
FIG. 1b shows a schematic illustration of the rear side of the closure element.

FIG. 1a shows in a schematic illustration a plan view of one embodiment of the front side and FIG. 1b shows a plan view of the rear side of the closure element 1 in accordance with the invention.

The closure element 1 in accordance with the invention consists of a base cover 2, into which, as shown in FIG. 1a, beads 3 are incorporated which extend concentrically and increase flexural rigidity.

As shown in FIG. 1b, the rear side 2b of the base cover 2, i.e., the side facing towards the pipe interior 13c (see FIGS. 3 and 4) after closure of the end 13a of the pipe 13, is provided with in this example four bolt-like elements 4 which are distributed over the inner surface of the base cover 2 at a uniform angular spacing onto radially extending plug-in strips 11 which are formed in one piece with the base cover 2. These bolt-like elements 4 are disposed in pairs next to one another and extend in the radial direction. The radial extension of the plug-in strip and the radial spacing between the bolt-like elements 4 are configured such that the currently provided nominal wall thickness of the pipe 13 can be adjusted without difficulty.

Figure 2:
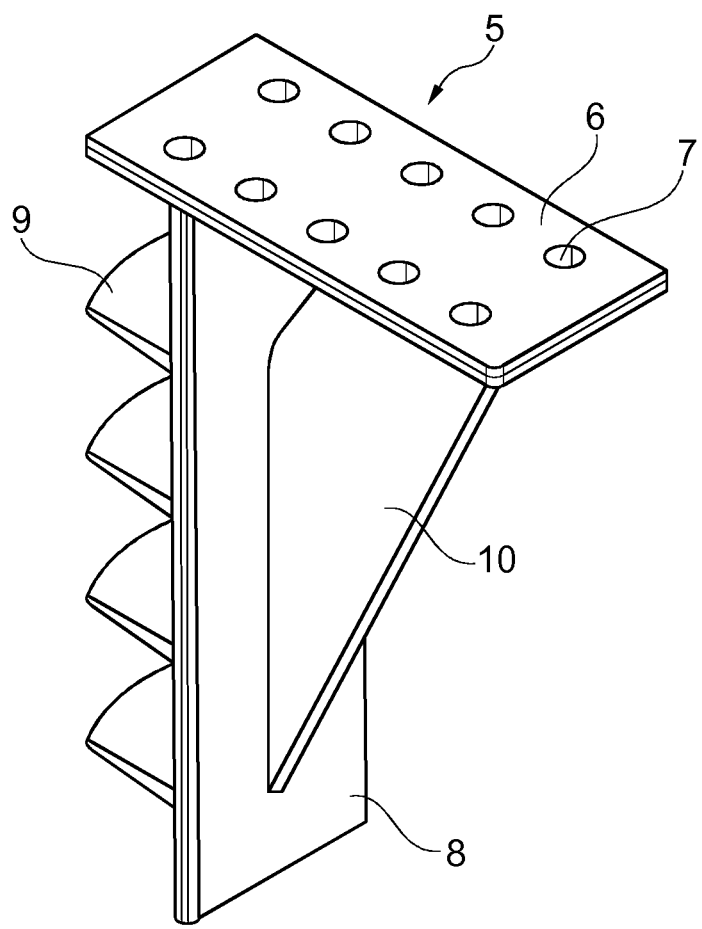
FIG. 2 shows a schematic illustration of the clamping element.

FIG. 2 schematically shows a clamping element 5 in accordance with the invention. The clamping element 5 consists of a bearing plate 6 which can be connected to the base cover 2 and into which bores 7 are incorporated, whose arrangement corresponds to the raster dimension of the bolt-like elements 4. The arrangement of the bores 7 in the bearing plate 6 corresponds to the arrangement of the bolt-like elements 4 on the plug-in strips 11 of the base cover 2. In terms of diameter, the bores 7 are configured such that the bearing plate 6 comprising the bores 7 can be attached in a clamping manner to the bolt-like elements 4.

The bearing plate 6 is adjoined by a support strip 8 which is disposed at a right angle thereto and which is formed in one piece with the bearing plate 6. Disposed on the side of the support strip 8 facing towards the inner side of the pipe are elastically deformable, laterally protruding clamping lips 9 which are aligned approximately in parallel with the bearing plate 6. Provided on the other side is a stiffening portion 10 which extends between the bearing plate 6 and support strip 8. The stiffening portion 10 is important to ensure that sufficient clamping force can be applied by the clamping lips 9 onto the inner surface 13b of the pipe.

If the clamping element 5 of FIG. 2 is attached to the bolt-like elements 4 of the plug-in strip 11 of the base cover 2 as shown in FIG. 1b, in this example the bearing plate 6 having ten bores 7 becomes clamped with the corresponding bolt-like elements 4 on the base cover 2. The radial position of the bearing plate 6 on the plug-in strip 11 is designated by the reference numeral 12.

The number of bolt-like elements 4 extending in the radial direction on the plug-in strip 11 of the base cover 2 should be at least the same as the corresponding number of bores in the bearing plate 6, so that the clamping element 5 is seated sufficiently firmly on the base cover 2.

In order to ensure that the clamping element 5 can be radially adjusted on the base cover 2, as required in accordance with the invention, the extension of the bearing plate 6 on the base cover 2 or the plug-in strip 11 must be less than the radius of the base cover 2 or the length of the plug-in strip 11.

By positioning the bearing plate 6 differently on the plug-in strip 11 of the base cover 2, it is possible to adapt the clamping elements 5 very simply to suit the different wall thicknesses of pipes 13. The position of the bearing plate 6 attached to the plug-in strip 11 is established such that after the elastic clamping lips 9 of the closure element 1 have been inserted into the end 13a of the pipe 13 they become clamped with the inner surface 13b of the pipe and ensure a firm seating which is not compromised under transport conditions.

Figure 3:
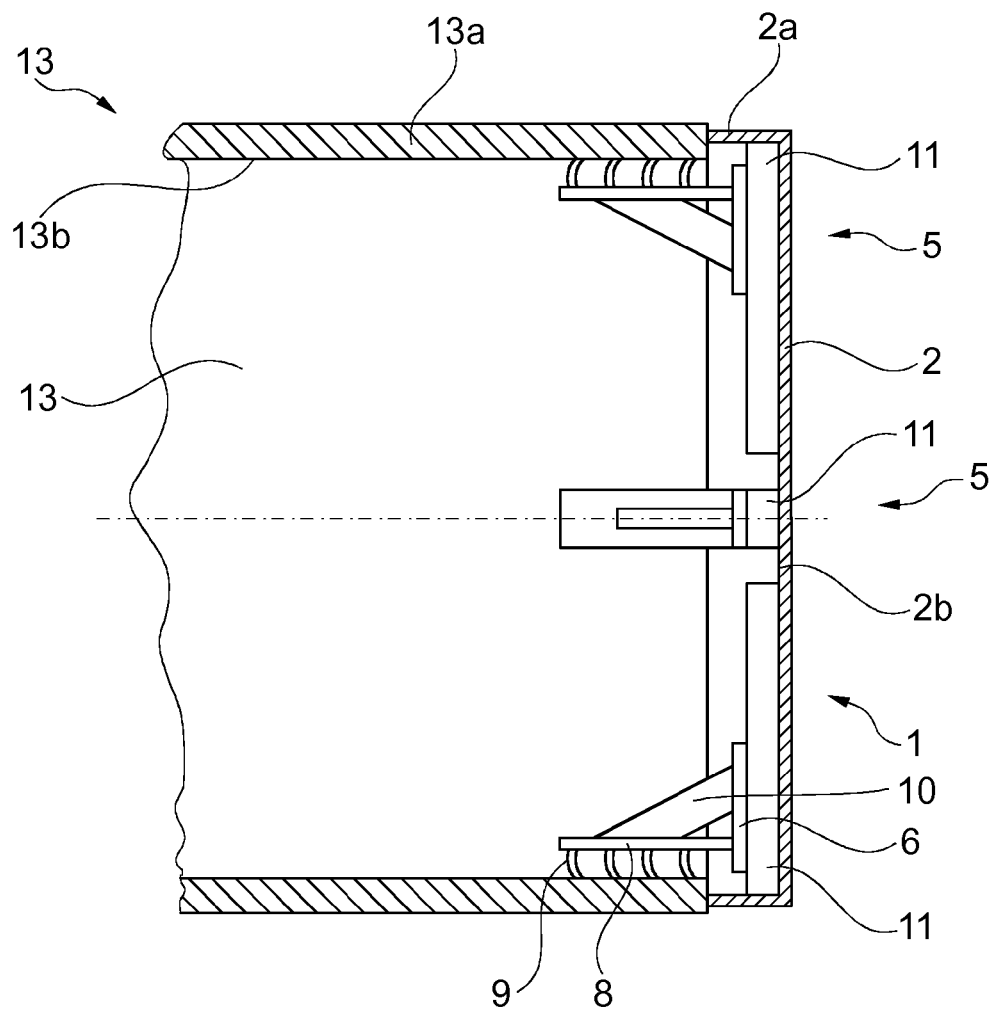
FIG. 3 shows a schematic sectional illustration of an end of a thinner pipe with a closure element and FIG. 4 shows a schematic sectional illustration of an end of a thicker pipe with a closure element.

FIG. 3 shows a schematic sectional illustration of an end 13a of a pipe 13 having a thinner wall thickness which is closed by a closure element 1. The closure element 1 consists substantially of the base cover 2 and the clamping element 5. It is evident that the flat and round base cover 2 comprises on its outer periphery a circumferential edge 2a which adjoins the base cover 2 at a right angle and forms a type of circumferential casing. The circumferential edge 2a has approximately a height of 2 cm and is directed in the direction of the pipe 13 which is to be closed. The base cover 2 is thus formed on the whole in a cup-shaped manner. It is also evident that the outer diameter of the base cover 2 is smaller than the outer diameter of the pipe 13 and is thus set back with respect to the pipe 13. As stated previously, the outer diameter of the base cover 2 and the outer diameter of the pipe 13 can at most be identical. It must not be larger, since it then protrudes beyond the outer periphery of the pipe 13 and the base cover 2 could be pushed off. The total of four plug-in strips 11 are attached to the rear side 2b of the base cover 2. In this case, the height of the plug-in strips 11 is less than the length of the edge 2a of the base cover 2 and corresponds approximately to half the length of the edge 2a of the base cover 2. The height of the plug-in strips 11 is selected such that when the base cover 2 is in the assembled condition the bearing plate 6 of the clamping element 5 acquires sufficient space between an end side 13d of the pipe 13 and the plug-in strip 11 and, upon closure of the end 13a of the pipe 13, the edge 2a of the base cover 2 is not prevented from coming into abutment against the end side 13d of the pipe 13. In this case, the plug-in strips 11 begin at the edge 2a of the base cover 2 and end in the region of the centre of the base cover 2. It is also apparent that the clamping lips 9 are supported on the inner surface 13b of the pipe 13 and are deflected slightly in the direction of the opening of the pipe 13 by reason of the insertion procedure.

Figure 4:
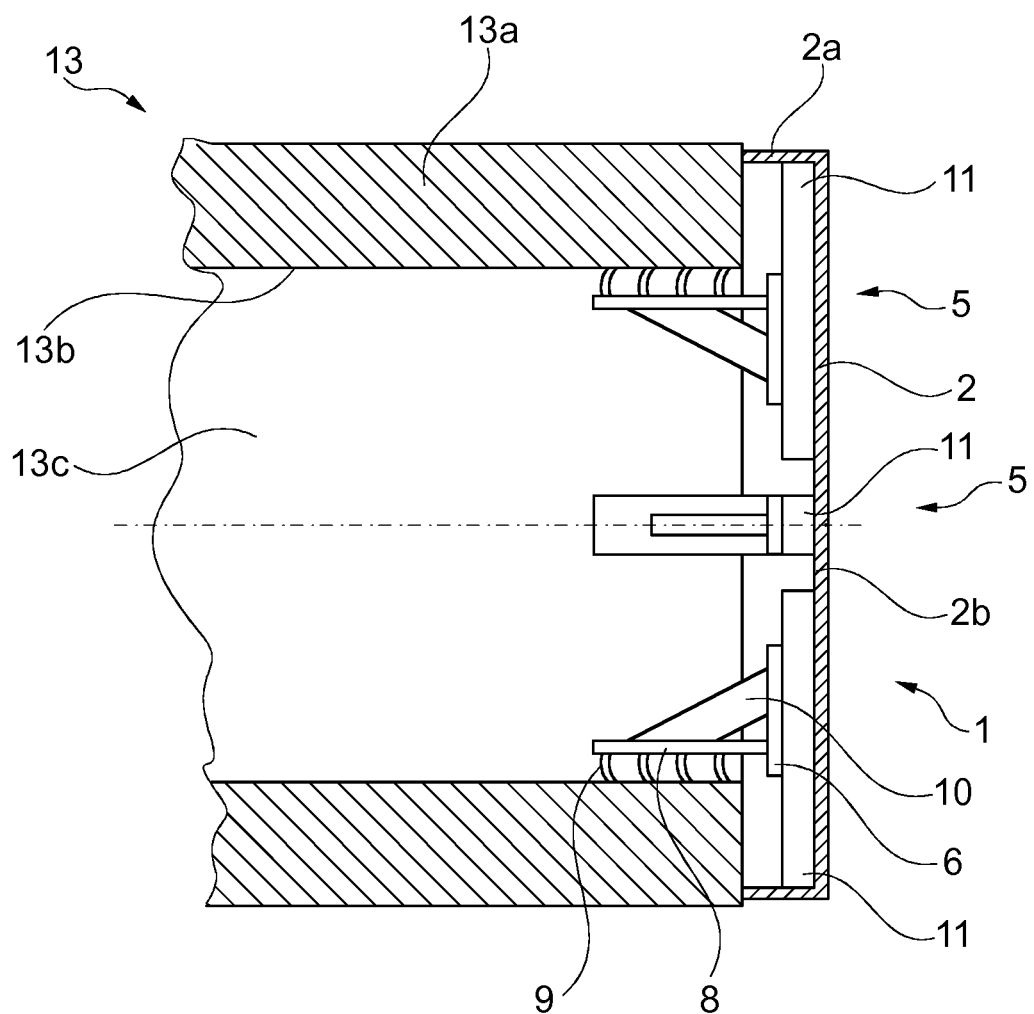

FIG. 4 is a schematic sectional illustration—corresponding substantially to FIG. 3—of an end 13a of a pipe 13 having a greater wall thickness in comparison with the pipe 13 in FIG. 3 which is also closed by a closure element 1. With respect to FIG. 3 it is apparent that the clamping elements 5 are further inwardly offset on the plug-in strips 11, since the wall thickness of the pipe 13 is thicker. The closure element has thus been adapted in a convenient manner to the other wall thickness of the pipe 13. In this case, the bores 7 in the bearing plate 6 of the clamping element 5 are then in engagement with other bolt-like elements 4 of the plug-in strip 11.

LIST OF REFERENCE NUMERALS

1 closure element
2 base cover
2*a* edge
2*b* rear side
3 beads
4 bolt-like elements
5 clamping element
6 bearing plate
7 bores
8 support strip
9 elastic clamping lips
10 stiffening portion
11 plug-in strip
12 radial position of the bearing plate 6
13 pipe
13*a* end of the pipe
13*b* inner surface of the pipe
13*c* pipe interior of the pipe

The invention claimed is:

1. Closure element for closing an end of a pipe, the closure element having a circular base cover, configured in an assembled condition to close the end of the pipe and including on a side facing towards the pipe at least two clamping elements, wherein the clamping elements are disposed in the assembled condition to be supported on an inner surface of the pipe and hold the base cover for closing the end of the pipe, wherein the clamping elements are releasably attached to the base cover and are configured to be attached in various positions to the base cover for selectively adjusting the radial position of the clamping elements on the base cover, wherein the clamping elements can be attached via a raster-like plug-in connection to the base cover in raster-like positions in accordance with the currently provided wall thickness of the end of the pipe to be closed, wherein the outer diameter of the base cover corresponds at most to the outer diameter of the pipe, and wherein the raster-like attachment of the clamping elements to the base cover is adapted to the respective standard nominal wall thicknesses of the pipes to be closed.

2. Closure element as claimed in claim 1, wherein the clamping element comprises a bearing plate and the plug-in connection comprises bolt-like elements, which are disposed on the base cover, in a defined raster dimension and comprises the bearing plate which can be connected to the bolt-like elements and which, in order to receive the bolt-like elements in a clamping manner during attachment, is provided with corresponding bores which are adapted to the bolt diameter and the raster dimension of the bolt-like elements.

3. Closure element as claimed in claim 2, wherein the bolt-like elements are disposed on plug-in strips on the base cover.

4. Closure element as claimed in claim 3, wherein the bearing plate can be connected to the base cover at least at two radial positions.

5. Closure element as claimed in claim 1, wherein the base cover is provided with beads which increase rigidity.

6. Closure element as claimed in claim 5, wherein the beads extend concentrically.

7. Closure element as claimed in claim 1, wherein the base cover consists of dimensionally stable, engineering synthetic material and the clamping elements consist of elastic polyethylene.

8. Closure element as claimed in claim 7, wherein the engineering synthetic material has a density of more than 1 g/cm$^3$.

9. Closure element as claimed in claim 1, wherein the clamping element comprises several elastically resilient clamping lips which protrude into the interior of the pipe and in the assembled condition become clamped with the inner wall of the pipe.

10. Closure element as claimed in claim 1, wherein in dependence upon the inner diameter of the pipe of the base cover, for clamping concentrically on the inner surface of the pipe, a large number of clamping elements are disposed concentrically on the base cover.

11. Closure element as claimed in claim 1, wherein in order to remove the closure element from the end of the pipe, the base cover comprises a material weakness or an opening, into which a tool can be introduced and become hooked together with the base cover.

* * * * *